June 7, 1960 T. P. FARKAS 2,939,280
HYDRO-PNEUMATIC FUEL CONTROL FOR TURBINE POWER PLANTS
Filed Feb. 24, 1955
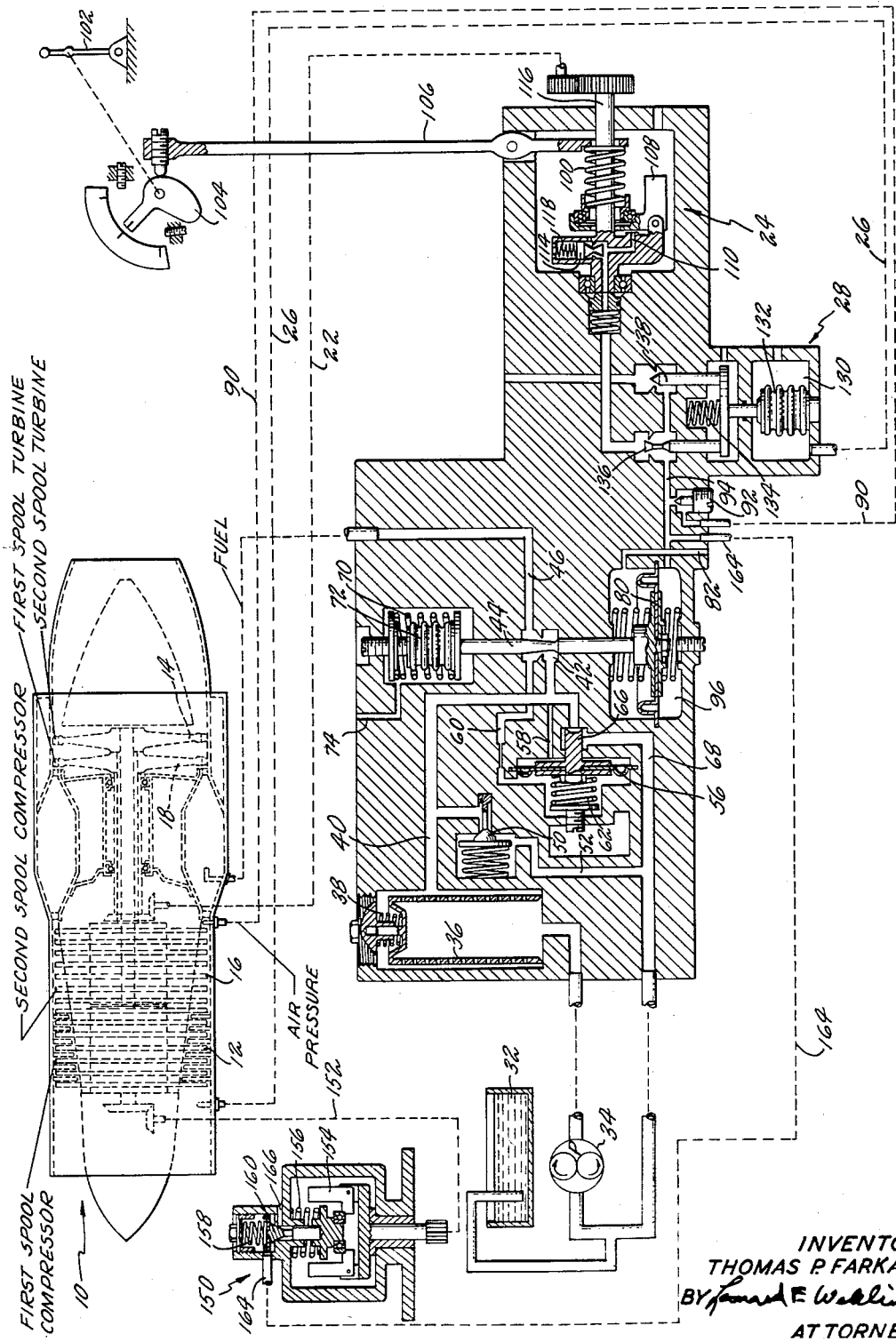
INVENTOR
THOMAS P. FARKAS
BY *Leonard E. Wasklind*
ATTORNEY

United States Patent Office 2,939,280
Patented June 7, 1960

2,939,280

HYDRO-PNEUMATIC FUEL CONTROL FOR TURBINE POWER PLANTS

Thomas P. Farkas, Bloomfield, Conn., assignor to United Aircraft Corporation, East Hartford, Conn., a corporation of Delaware Filed Feb. 24, 1955, Ser. No. 490,257

3 Claims. (Cl. 60—39.28)

This invention relates to power plant controls and more specifically fuel controls for turbine type power plants.

It is an object of this invention to provide a simple yet accurate fuel control which is composed of a minimum of parts.

It is a further object of this invention to provide a fuel control which is primarily pneumatic in operation insofar as regulation of the main fuel supply is concerned.

It is another object of this invention to provide a fuel control of the type described which utilizes the discharge pressure of the compressor as the primary regulating pressure and has this pressure signal modified as a function of the speed of the power plant and the inlet air temperature.

A still further object of this invention is to provide a fuel control particularly adapted to turbine power plants of the twin spool type or those having split turbines.

These and other objects of this invention will become readily apparent from the following detail description of the drawing which illustrates the fuel control in partial cross section and partially schematically along with the necessary environment.

Referring to the drawing a turbine jet engine is generally illustrated at 10. The engine or power plant is composed of a compressor, a combustion section and a turbine section. The compressor and turbine sections are formed in a twin spool arrangement and may be referred to as a split turbine arrangement. As shown, the low pressure compressor 12 is driven by the second stage turbine 14 and together form the first spool. The second stage or high pressure compressor 16 is operatively connected to the first stage turbine 18 and together form the second spool. The arrangement might readily be such that one element of a split turbine unit might drive a propeller or helicopter rotor while another element drives the compressor. This invention as hereinafter described is equally applicable to these other arrangements.

The fuel control of this invention primarily controls fuel flow in accordance with the speed of the second spool or, in other words, the speed of the compressor 16 and turbine 18. The speed of the second spool is obtained as a signal via the connection shown by the dotted line 22 which connection rotates the governor unit generally indicated at 24. The mode of operation of this governor unit will be described in detail hereinafter.

The fuel control also obtains a signal via the line 26 which signal is a function of compressor inlet temperature. This signal is fed to the temperature compensating unit generally indicated at 28. Before describing the operation of these controlling units it is best to describe first the fuel flow regulating or hydraulic portion of the fuel control as distinct from the pneumatic portion.

Thus, as seen in the drawing, a fuel reservoir 32 is provided from which the fuel is drawn by a pump 34 which in turn pressurizes the fuel and forces it through a filter element 36. The filter element is of the type such that should the flow be excessively restricted by clogging a build-up of pressure occurs and forces the element upwardly against the pressure of spring 38 so that the filter element 36 is bypassed. Fuel in any event flows to the line 40 whereat it can pass to the inlet 42 of the throttle valve 44 and then to the outlet line 46 to the combustion section of the power plant 10.

As the fuel leaves the filter 36 its pressure acts on a relief valve 50 which is preset to bypass fuel to the line 52 and the pump inlet in the event that the fuel pressure begins to exceed a predetermined maximum.

A spring biased diaphragm 56 has each operative side thereof exposed to the pressure at the inlet and outlet sides of the throttle valve 44 by passages 58 and 60 respectively. With the spring 62 set as desired, the diaphragm will actuate a bypass valve 66 so as to return fuel to the line 68 and the pump inlet when the pressure drop across the throttle valve begins to exceed a predetermined maximum. The capacity of the fuel system is such that the valve 66 and its actuating diaphragm 56 will maintain the pressure drop across the throttle valve constant so that for any given position of the throttle valve there will be a predetermined known fuel flow. The upper stem of the throttle valve 44 is engageable with a spring 70 and an evacuating bellows 72. The chamber surrounding the bellows 72 is exposed to ambient pressure by the line 74 so that the throttle valve will be biased in accordance with the variations in altitude. This altitude compensation is not necessarily in all systems and may or may not be present according to the needs of the specific engine.

As mentioned previously, the throttle valve 44 is primarily controlled by the speed responsive unit 24 and the temperature responsive unit 28. Direct actuation of the throttle valve 44 is provided by the diaphragm 80 which on its upper side is exposed to ambient pressure by means of the line 82 and on its lower side by compressor discharge pressure modified in a manner to be described. Compressor discharge pressure is supplied via a line 90 through an adjustable orifice 92 to the line 94 and then to the chamber 96 on the lower side of the diaphragm 80. For primary control the compressor discharge pressure in the line 94 is modified by the speed sensing unit 24. This unit comprises a speeder spring 100 which is set by the pilot's lever 102 via the cam 104 and the lever 106. The flyweight 108 responds to variations in speed of the second spool of the engine to thereby vary the amount of bleed past the orifice 110. This bleeding action will vary the value to which the compressor discharge pressure can rise under any given conditions. Therefore, the size of the orifice 110 provides a signal whose value is a function of speed error.

It should be emphasized that compressor discharge pressure ($P_3$) is deliberately chosen as a servo pressure thereby automatically providing a system such that with variations in speed the fuel flow ($W_f$) is metered per unit compressor discharge pressure or as a function of $$\frac{W_f}{P_3}$$

A speed responsive valve 114 is also provided and acts to bleed a certain amount of air under pressure as a function of actual speed alone. Valve 114 can either open or close a bleed with increasing r.p.m. so that as r.p.m. increases more or less air is bled at first (out of line 94), so as to decrease or increase the ratio of fuel flow to engine (compressor) pressure. As the set speed is approached valve 110 opens to bleed more air out of line 94 so as to reduce fuel flow.

In order to properly trim the fuel control or to have it more closely follow a desired operational curve the compressor inlet air temperature sensing unit 28 is provided. As previously stated compressor inlet air passes via the line 26 to the chamber 130 surrounding a suitable fluid filled temperature sensing bellows 132. The bellows 132 acts in opposition to the spring 134 and actuates a pair of valve 136 and 138. As shown herein the valve 136 is in series with the speed responsive orifices 114 and 110. On the other hand the valve 138 is in parallel with the speed responsive orifices 114 and 110.

With the orifices controlled by the valves 136 and 138 responding oppositely to changes in air temperature, a closer approximation to a desired operational curve is obtainable. For example, when the speed compensating orifice 114 is fairly wide open the parallel orifice controlled by valve 138 has very little effect. On the other hand, when the speed compensating orifice 114 is near the closed position the temperature compensating orifice controlled by valve 138 has a comparatively large effect.

The use of a series and a parallel orifice permits the use of different temperature compensating functions at high and low r.p.m.

In summary, compressor discharge pressure is fed from the line 90 through the adjustable or fixed orifice 92 and to the chamber 96 on the bottom of the diaphragm 89. Primarily, fuel flow is adjusted as a function of the level of compressor discharge pressure. Thus compressor discharge pressure as a parameter provides a continuous signal which is effective over all ranges of operation. Under steady state control and normal temperatures, the temperature responsive valve 136 has a large opening so as to present no restriction in the line thereby permitting either the valves 110 or 114 to dominate control. The flapper-type bleed valve 110 provides a speed error signal, when such exists, to modify the compressor discharge pressure. During acceleration, the orifice 110 will be in a minimum open position since the power control 102 is calling for maximum fuel. Thus the full pressure level of the compressor discharge pressure signal wants to open the throttle valve 44 to a maximum. However, to avoid compressor surge, it is necessary to inject maximum limiting parameters. In this case (acceleration) the inlet temperature responsive valves 136 and 138 and the pure speed responsive valve 114 come into play.

At high speeds, the speed compensating valve 114 is wide open, therefore, the series temperature responsive valve 136 will have a relatively large effect in metering while parallel valve 138 will have little effect. At low speeds the speed compensating orifice is nearly closed and the series temperature responsive valve 136 has little effect while the parallel temperature responsive valve 138 has a relatively large effect. By properly contouring each of the temperature and speed valves 136, 138 and 114, respectively, substantially any desired maximum limiting curves can be obtained over a large range of speed. Thus, both speed and temperature signals are multiplied by the compressor discharge signal for acceleration limiting.

It should be pointed out that for various types of engines it may not be necessary to utilize this particular type of temperature compensating system since it may be possible to produce essentially the same result with different combinations of speed sensing orifices.

In a twin spool type of power plant as illustrated herein (or a multiple turbine power plant) it is apparent that the main fuel control responds only to the speed of the second spool i.e. the speed first turbine stage or the second stage compressor section. Let us assume then that for structural or other limitations the main fuel control is set so that the speed of the second spool does not exceed for example 9000 r.p.m. In a power plant of this type the structural or operational limitation for the first spool compressor may be such that its speed should not exceed 6000 r.p.m. When the main fuel control then is set so as to prevent the second spool from exceeding 9000 r.p.m. it would be reasonable to expect that the speed of the first spool would normally not exceed its 6000 r.p.m. limit. However, under certain operating conditions it is possible that when the second spool is operating below its 9000 r.p.m. limit the first spool may tend to operate above its 6000 r.p.m. limit. In order to avoid excessive speed of the first spool one remedy would be to lower the maximum speed of the second spool. However, under such a setting the engine would be deprived of producing its maximum potential thrust output.

For this purpose another speed sensing unit is generally indicated at 150. This unit senses the speed of the first spool via the line 152 and contains governor flyweights 154 which work against a pair of springs 156 and 158. The flyweights 154 at high speeds physically lift a valve 160 off its seat so that air may be bled from the line 164 overboard via a vent 166. The line 164 is connected to the compressor discharge pressure line 94 of the main fuel control. It will then be apparent that even though the main fuel control were calling for a greater fuel flow and a greater pressure in the line 94 the pressure therein would be reduced whenever the speed of the first spool exceeded its desired maximum. Thus, a topping control is also provided to limit the speed of the first spool.

As a result of this invention it will be apparent that a simple hydropneumatic type of fuel control has been provided which is rugged yet highly accurate. Furthermore, the fuel control is adaptable to both single spool and twin spool type turbine power plants with a minimum of modification.

Although only one embodiment of this invention has been illustrated and disclosed herein it will be apparent that various changes and modifications may be made in the construction and arrangement of the various parts without departing from the scope of this novel concept.

What it is desired by Letters Patent is:

1. In a pneumatic fuel control for a turbine type power plant having a compressor, a combustion chamber, and a turbine for driving the compressor, a source of fuel under pressure, means for regulating the flow of fuel from said source to the power plant including throttle valve, means for maintaining constant the pressure drop across said throttle valve, means for moving said throttle valve including a servo device including a movable wall connected directly to said throttle valve and having an expansible control chamber, means for continuously conducting air from the discharge side of said compressor to said chamber to move and position said wall including a restriction between said source and said chamber, a first valve means actuated by means movable in response to the air temperature at the compressor inlet for regulating air flow out of said chamber, means for setting a desired speed, speed responsive means including a centrifugal governor-actuated second valve means movable in response to the difference between said setting and the speed of the power plant, said second valve thereby being positioned in accordance with speed error and further regulating the flow of air from said chamber to regulate the pressure in said chamber, a third valve means for further regulating the flow of air from said chamber and actuated by centrifugal governor means movable in accordance with the actual speed of the power plant, said first valve means having two orifices in parallel, one of said orifices being disposed in series with said second and third valves and the other of said orifices bleeding to atmosphere, said orifices having the control areas thereof simultaneously varied inversely with the motion of its respective movable means, said third valve being connected in parallel with said second valve, said valves being arranged so that during steady state said first valve means presents a substantially low regulating effect and said second valve regulates the value of the pressure in said chamber, and during acceleration said second valve is substantially closed and said first and third valves provide the controlling effect on the pressure in said chamber.

2. In a fuel control according to claim 1 wherein the power plant includes two independently rotatable turbines and said speed responsive means responds to the speed of one of said turbines, said speed responsive means including a fourth valve having a member moved by means movable in accordance with speed of the other turbine to further bleed air from said chamber to limit the speed of the power plant to a predetermined safe maximum.

3. In a fuel control according to claim 1 including a bellows having a second wall movable in response to changes in altitude for opposing the motion of said first-mentioned movable wall.

References Cited in the file of this patent

UNITED STATES PATENTS

| | | |
|---|---|---|
| 2,187,120 | Gosslau et al. | Jan. 16, 1940 |
| 2,219,994 | Jung | Oct. 29, 1940 |
| 2,233,307 | Dodson | Feb. 25, 1941 |
| 2,306,953 | Jung | Dec. 29, 1942 |
| 2,503,048 | Ifield | Apr. 4, 1950 |
| 2,603,063 | Ray | July 15, 1952 |
| 2,629,982 | Hooker | Mar. 3, 1953 |
| 2,667,743 | Lee | Feb. 2, 1954 |
| 2,691,268 | Prentiss | Oct. 12, 1954 |
| 2,705,047 | Williams et al. | Mar. 29, 1955 |
| 2,720,752 | Chandler et al. | Oct. 18, 1955 |
| 2,785,848 | Lombard | Mar. 19, 1957 |
| 2,807,138 | Torell | Sept. 24, 1957 |